United States Patent
Goda

(10) Patent No.: US 10,963,197 B2
(45) Date of Patent: Mar. 30, 2021

(54) IMAGE PROCESSING APPARATUS THAT INSTALLS APPLICATION MODULES, CONTROL METHOD THEREFOR, AND STORAGE MEDIUM

(71) Applicant: CANON KABUSHIKI KAISHA, Tokyo (JP)

(72) Inventor: Keigo Goda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/665,773

(22) Filed: Aug. 1, 2017

(65) Prior Publication Data
US 2018/0046417 A1 Feb. 15, 2018

(30) Foreign Application Priority Data
Aug. 15, 2016 (JP) .............................. JP2016-159136

(51) Int. Cl.
| | |
|---|---|
| *G06F 9/44* | (2018.01) |
| *H04N 1/00* | (2006.01) |
| *G06F 3/12* | (2006.01) |
| *G06F 9/4401* | (2018.01) |
| *G06F 13/42* | (2006.01) |
| *G06F 13/38* | (2006.01) |

(52) U.S. Cl.
CPC .......... *G06F 3/1225* (2013.01); *G06F 3/1284* (2013.01); *G06F 9/4411* (2013.01);
(Continued)

(58) Field of Classification Search
CPC .... G06F 9/4411; G06F 9/4413; G06F 9/4415; G06F 9/445; G06F 13/387; G06F 13/385;
(Continued)

(56) References Cited

U.S. PATENT DOCUMENTS 6,957,437 B1 * 10/2005 Bogia ................... G06F 3/1204
710/10
7,668,986 B2 * 2/2010 Lowe .................... G06F 9/4415
710/62

(Continued)

FOREIGN PATENT DOCUMENTS

JP 2010165128 A 7/2010
JP 2010186239 A 8/2010
(Continued)

OTHER PUBLICATIONS

Office Action issued in Japanese Appln. No. 2016-159136 dated May 26, 2020.

*Primary Examiner* — Chad Dickerson
(74) *Attorney, Agent, or Firm* — Rossi, Kimms & McDowell LLP

(57) ABSTRACT

An image processing apparatus which is able to prevent a decrease in general versatility of an expansion application. The image processing apparatus has an operating system and the expansion application for expanding functions. When a USB device is connected to the image processing apparatus, a USB I/F communicates with the connected USB device. The connected USB device is controlled using the operating system or the expansion application. It is determined whether or not the connected USB device is a predetermined operating device that operates the image processing apparatus. When the connected USB device is the predetermined operating device, the connected USB device is controlled using the operating system.

8 Claims, 6 Drawing Sheets

(52) U.S. Cl.
CPC .......... *G06F 9/4413* (2013.01); *G06F 13/385* (2013.01); *G06F 13/4295* (2013.01); *H04N 1/00074* (2013.01); *H04N 1/00087* (2013.01); *H04N 1/00941* (2013.01); *G06F 2213/0042* (2013.01)

(58) Field of Classification Search
CPC .. G06F 13/4295; G06F 3/1225; G06F 3/1284; G06F 2213/0042; H04N 1/00962; H04N 1/00965; H04N 1/00074; H04N 1/00087; H04N 1/00941
USPC ................. 358/1.11–1.18, 400–404; 399/12; 710/8–14; 719/321, 327
See application file for complete search history.

(56) References Cited

U.S. PATENT DOCUMENTS

| | | | | |
|---|---|---|---|---|
| 7,865,640 | B1 * | 1/2011 | Lewis | G06F 3/023 710/62 |
| 8,351,821 | B2 | 1/2013 | Asahara | |
| 8,825,909 | B1 * | 9/2014 | Delco | G06F 9/4411 710/8 |
| 2004/0205778 | A1 * | 10/2004 | Wong | G06F 13/102 719/321 |
| 2005/0216603 | A1 * | 9/2005 | Michaud | G06F 13/387 709/250 |
| 2009/0217304 | A1 * | 8/2009 | Shih | G06F 9/4411 719/321 |
| 2010/0178066 | A1 * | 7/2010 | Asahara | G03G 15/5083 399/12 |
| 2012/0226828 | A1 * | 9/2012 | Uehara | G06F 9/4413 710/8 |
| 2013/0036431 | A1 * | 2/2013 | Douceur | G06F 21/53 719/327 |

FOREIGN PATENT DOCUMENTS

| | | | |
|---|---|---|---|
| JP | 2012181698 A | 9/2012 | |
| WO | WO-2015165774 A1 * | 11/2015 | ........... G06F 13/102 |

* cited by examiner

*FIG. 6*

| NO. | VENDER ID | PRODUCT ID |
|---|---|---|
| 1 | 04a9 | 1234 |
| 2 | 04a9 | 5678 |

IMAGE PROCESSING APPARATUS THAT INSTALLS APPLICATION MODULES, CONTROL METHOD THEREFOR, AND STORAGE MEDIUM

BACKGROUND OF THE INVENTION

Field of the Invention

The present invention relates to an image processing apparatus, a control method therefor, and a storage medium.

Description of the Related Art

An MFP which is an image processing apparatus performing standard functions such as copying, scanning, and facsimile communication is known. The MFP has an operating unit comprised of a touch panel, operating keys, and so forth, and receives instructions to execute jobs associated with the standard functions through user's operations on the operating unit. The MFP has an OS (operating system) module incorporated therein in advance, and when a USB device such as a USB memory or a USB keyboard is connected to the MFP, the MFP uses the connected USB device as a part of the MFP by controlling the connected USB device using the OS module. The MFP is able to install an expansion application module (hereafter referred to merely as an "expansion application") to perform a function that cannot be performed by the standard functions of the MFP, and the expansion application as well controls USB devices connected to the MFP. The expansion application is designed to have general versatility and supports a plurality of models of MFPs and a plurality of models of USB devices.

In the MFP, if both the OS module and the expansion application provide control for one USB device, this would cause a malfunction of the USB device. To address this problem, there has been proposed a technique that, when the MFP installs the expansion application, obtains identification information, which identifies USB devices controllable by the expansion application, from the expansion application, and based on the obtained identification information, determines whether to control the connected USB device using the OS module or the expansion application (see, for example, Japanese Laid-Open Patent Publication (Kokai) No. 2010-165128). As the identification information, for example, not information that identifies the USB device alone but information that identifies a type of the USB device is set so as to provide the expansion application with general versatility for models of USB devices.

For MFPs, adoption of a new arrangement in which the operating key unit in the operating unit is externally added as a USB device to the MFP is being contemplated from the viewpoint of reducing costs. In the MFP with this new arrangement, the operating key unit is a target to be controlled by the expansion application as distinct from the conventional arrangement. For this reason, if the expansion application developed based on specifications of the conventional MFPs is installed in the MFP with the new arrangement in which the operating key unit is externally added to the MFP, the expansion application not ready for control on the operating key unit would control and cause a malfunction of the operating key unit. To prevent a malfunction of the operating key unit, for example, deleting information indicating a USB device type to which the operating key unit belongs (hereafter referred to as an "operating key type") from the identification information is conceivable.

However, when the information on the operating key type is deleted from the identification information, the expansion application cannot use USB devices other than the operating key unit, which belong to the operating key type, and hence the number of types of USB devices controllable by the expansion application is decreased, leading to a decrease in general versatility of the expansion application for USB devices. Moreover, in consideration of the general versatility of the expansion application for USB devices, if the expansion application including the identification information from which the information on the operating key type has been deleted is developed as a new expansion application for exclusive use in the MFP with the new arrangement, this expansion application cannot be used by other MFPs. This results in a decrease in general versatility of the expansion application for MFP models. Namely, the MFP with the new arrangement is required to change the identification information on the expansion application so as to prevent a malfunction of the operating key unit externally added to the MFP, and this presents a problem of causing a decrease in general versatility of the expansion application.

SUMMARY OF THE INVENTION

The present invention provides an image processing apparatus and a control method therefor which prevent a decrease in general versatility of an expansion application, as well as a storage medium.

Accordingly, the present invention provides an image processing apparatus that has an operating system and an expansion application for expanding functions, comprising a communication unit configured to, when a connected device is connected to the image processing apparatus, communicate with the connected device, a control unit configured to control the connected device using the operating system or the expansion application, and a determination unit configured to determine whether the connected device is a predetermined operating device that operates the image processing apparatus, wherein when the connected device is the predetermined operating device, the control unit controls the connected device using the operating system.

According to the present invention, a decrease in general versatility of an expansion application is prevented.

Further features of the present invention will become apparent from the following description of exemplary embodiments (with reference to the attached drawings).

BRIEF DESCRIPTION OF THE DRAWINGS

FIG. 6 is a diagram useful in explaining how a predetermined operating device is set according to the present embodiment.

DESCRIPTION OF THE EMBODIMENTS

Hereafter, an embodiment of the present invention will be described in detail with reference to the drawings.

In the following description of the present embodiment, it is assumed that the present invention is applied to an MFP which is an image processing apparatus, but the present invention should not necessarily be applied to the MFP but may be applied to information processing apparatuses, such as a PC, which are capable of communicating with a USB connected thereto.

Figure 1:
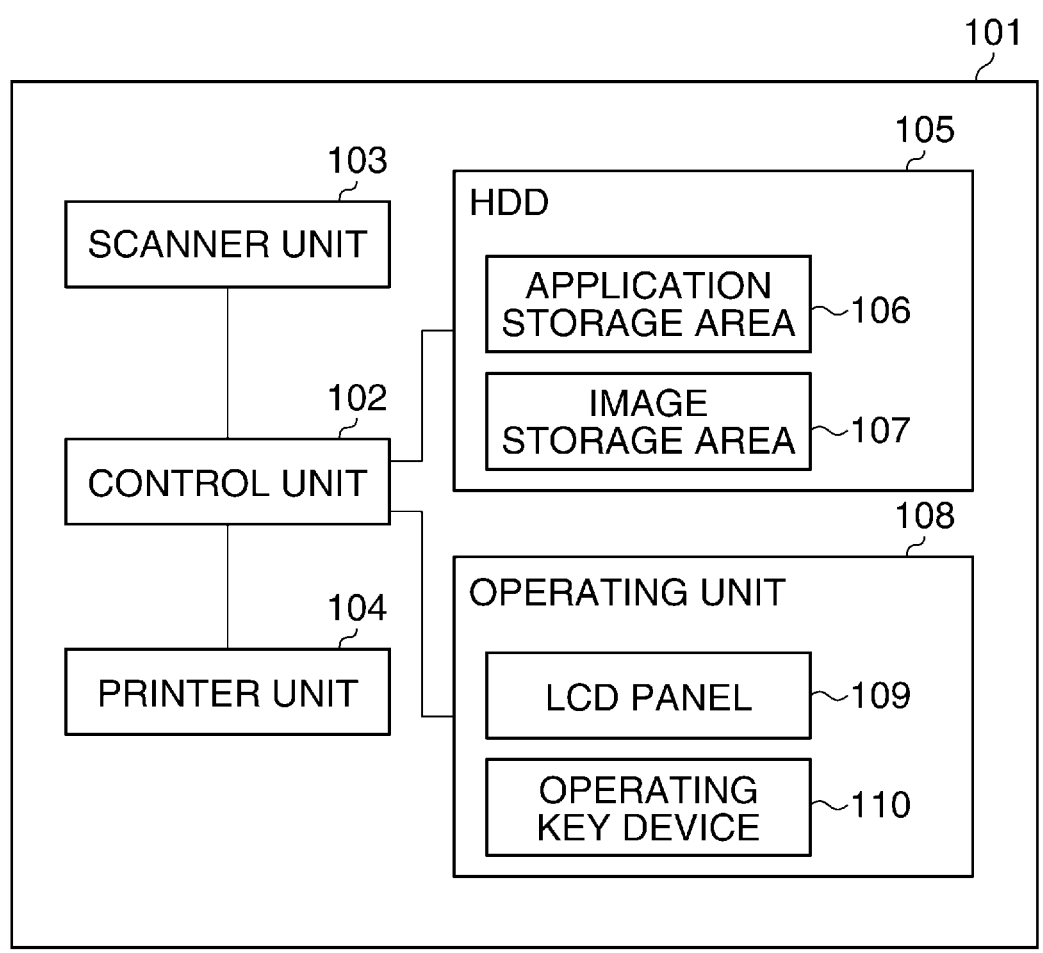
FIG. 1 is a block diagram schematically showing an arrangement of an MFP which is an image processing apparatus according to an embodiment of the present invention.

FIG. 1 is a block diagram schematically showing an arrangement of the MFP 101 which is the image processing apparatus according to the embodiment of the present invention.

Referring to FIG. 1, the MFP 101 has a control unit 102, a scanner unit 103, a printer unit 104, an HDD 105, and an operating unit 108. The control unit 102 is connected to the scanner unit 103, the printer unit 104, the HDD 105, and the operating unit 108. The operating unit 108 has an LCD panel 109 and an operating key device 110 (connected device). The operating key device 110 is connected to the MFP 101 via a USB I/F 211 (communication unit) in FIG. 2, to be described later.

The MFP 101 executes jobs such as copying, scanning, and facsimile communication. The MFP 101 is able to use a USB device, which is connected thereto via the USB I/F 211 in FIG. 2, to be described later, as a part of the MFP 101. The MFP 101 is also able to install a plurality of expansion applications.

The control unit 102 centrally controls the scanner unit 103, the printer unit 104, the HDD 105, and the operating unit 108 which are connected to the control unit 102. The scanner unit 103 reads an original placed on an original platen glass, not shown, to generate image data and outputs the image data to the HDD 105. The printer unit 104 obtains image data, which is generated by the scanner unit 103, from the HDD 105, and based on the obtained image data, performs printing on a sheet. The printer unit 104 also outputs the printed sheet to an output tray, not shown, or the like. The HDD 105 is a nonvolatile memory and has an application storage area 106 and an image storage area 107. For example, an execution program for an installed expansion application is stored in the application storage area 106, and for example, image data generated by the scanner unit 103 is stored in the image storage area 107. The operating unit 108 is a user interface of the MFP 101. The LCD panel 109 has a touch panel function of allowing a user to input data through touching operations. The operating key device 110 is a USB device which has a numeric key pad and a plurality of operating keys, conforms to USB standards, and is able to carry out communications via the USB I/F 211 in FIG. 2, which is comprised of relatively inexpensive components. For USB devices, class IDs indicating types of the USB devices are set in advance, and a class ID of a USB HID (Human Interface Device) class indicating types of USB devices that input a variety of information is set for the operating key device 110. A class ID of a USB mass storage class is set for USB devices which stores data, such as a USB memory 215 in FIG. 2, to be described later.

Figure 2:
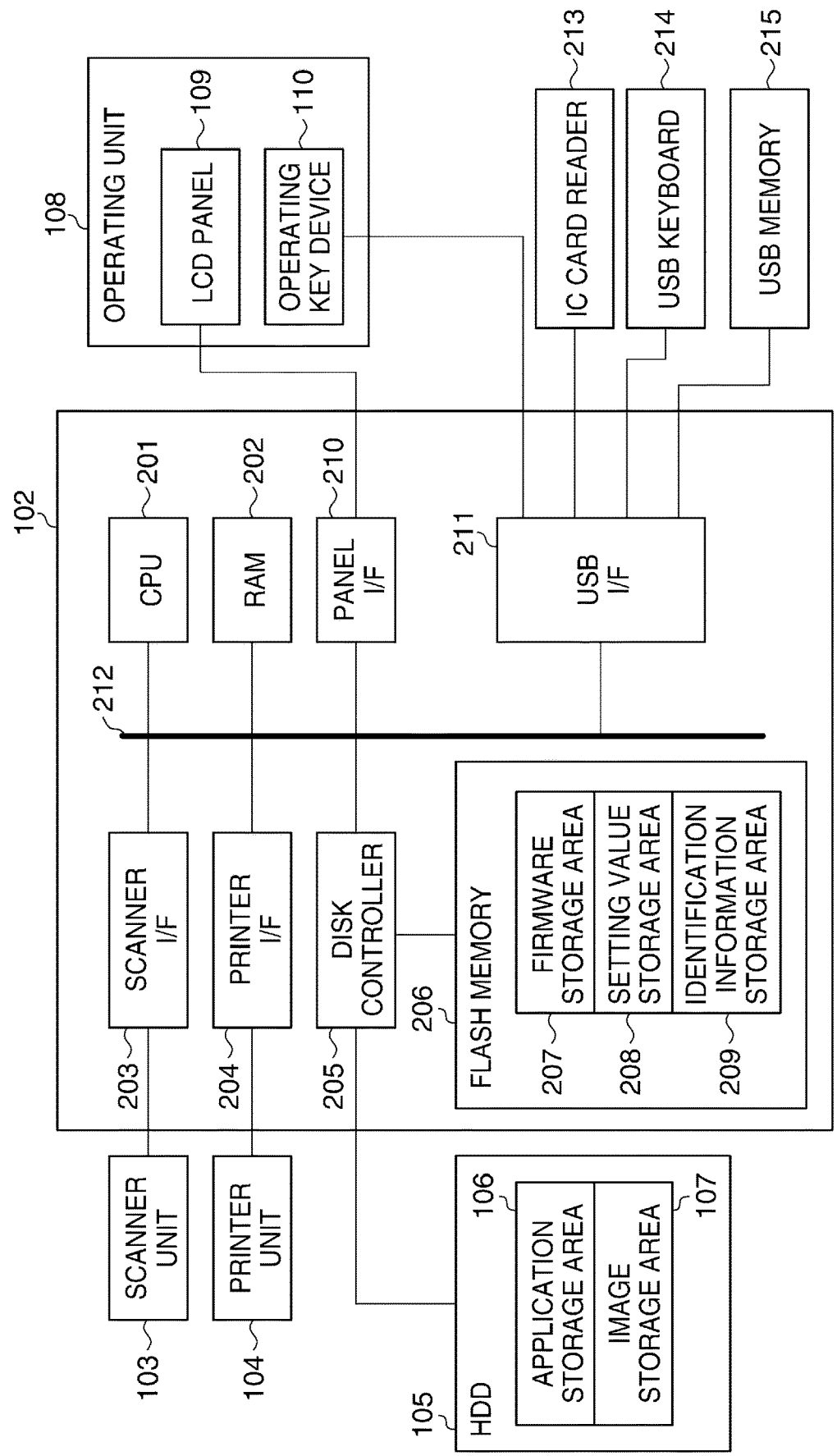
FIG. 2 is a block diagram schematically showing an arrangement of a control unit in FIG. 1.

FIG. 2 is a block diagram schematically showing an arrangement of the control unit 102 in FIG. 1.

Referring to FIG. 2, the control unit 102 has a CPU 201, a RAM 202, a scanner I/F 203, a printer I/F 204, a disk controller 205, a flash memory 206, a panel I/F 210, and the USB I/F 211. The CPU 201, the RAM 202, the scanner I/F 203, the printer I/F 204, the disk controller 205, the panel I/F 210, and the USB I/F 211 are connected to one another via a system bus 212.

The CPU 201 carries out processes of software modules 300 in FIG. 3, to be described later, by executing programs stored in the flash memory 206 and the HDD 105. The RAM 202 is used as a work area for the CPU 201 and also used as a temporary storage area for a variety of data. The scanner I/F 203 carries out data communications with the scanner unit 103, and the printer I/F 204 carries out data communications with the printer unit 104. The disk controller 205 carries out a process in which it writes a variety of data into the HDD 105 and the flash memory 206, and carries out a process in which it reads out a variety of data stored in the HDD 105 and the flash memory 206.

The flash memory 206 is a nonvolatile memory and has a firmware storage area 207, a setting value storage area 208, and an identification information storage area 209. For example, programs to be executed by the CPU 201 are stored in the firmware storage area 207, and various pieces of setting information on the MFP 101 are stored in the setting value storage area 208. Identification information obtained from the expansion application when it was installed is stored in the identification information storage area 209. The identification information includes at least any of a class ID indicating a type of a USB device controllable by the expansion application, or a vender ID and a product ID of the USB device.

The panel I/F 210 carries out data communications with the LCD panel 109. The USB I/F 211 carries out data communications with USB devices connected thereto such as an IC card reader 213, a USB keyboard 214, and the USB memory 215. In the present embodiment, the operating key device 110 of the operating unit 108 is connected to the MFP 101 via the USB I/F 211, and the USB I/F 211 sends input information, which is input through user's operation on the operating key device 110, to the CPU 201.

Figure 3:
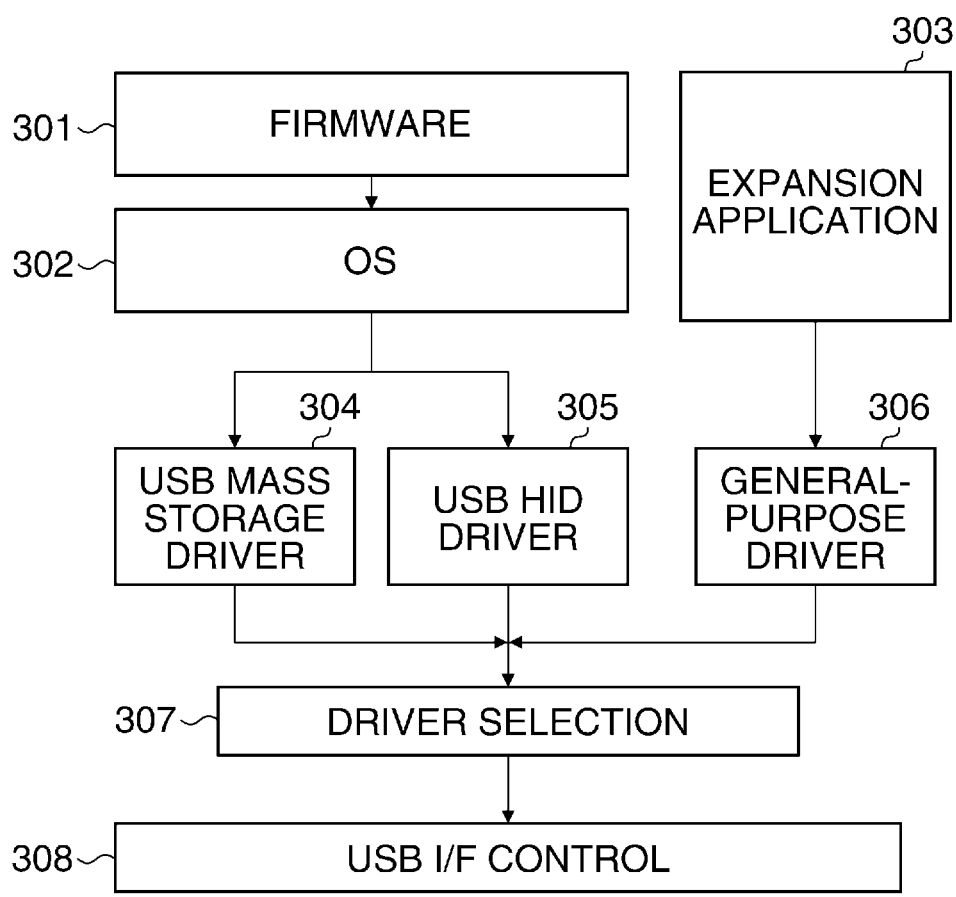
FIG. 3 is a block diagram schematically showing an arrangement of software modules of the MFP in FIG. 1.

FIG. 3 is a block diagram schematically showing an arrangement of the software modules 300 of the MFP 101 in FIG. 1.

Referring to FIG. 3, the software modules 300 include a firmware module 301, an operating system module (hereafter referred to as "the OS module") 302, an expansion application 303, and a USB mass storage driver module 304. The software modules 300 also include a USB HID driver module 305, a general-purpose driver module 306, a driver selection module 307, and a USB I/F control module 308. The expansion application 303 is stored in the HDD 105, and among the software modules 300 mentioned above, the modules other than the expansion application 303 are stored in the flash memory 206. The processes of the software modules 300 are carried out by the CPU 201 executing programs stored in the flash memory 206 and the HDD 105.

Figure 4:
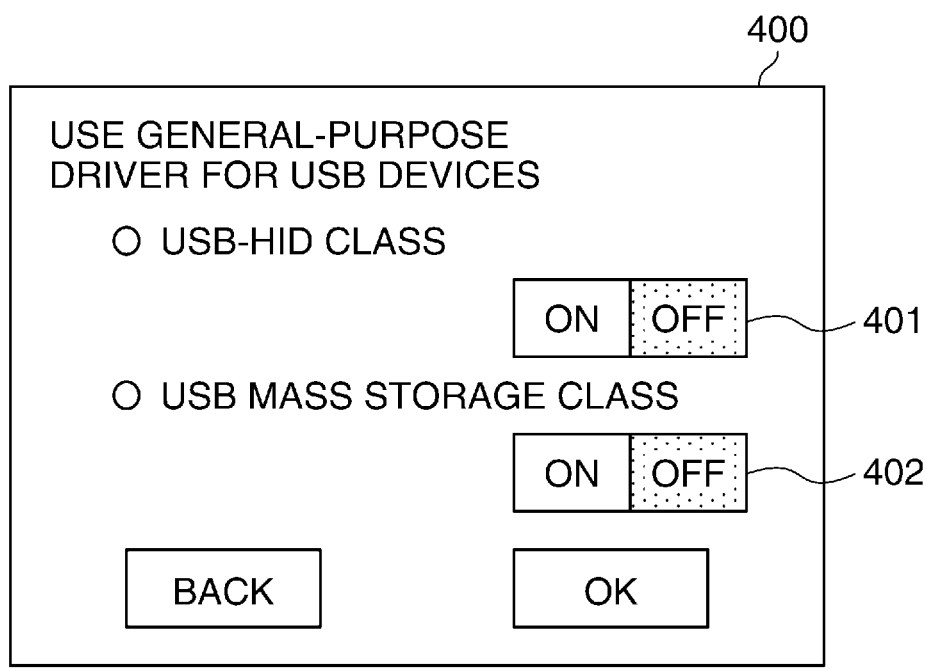
FIG. 4 is a view showing an exemplary setting screen which is displayed on an operating unit in FIG. 1.

The firmware module 301 offers the standard functions of the MFP 101. The OS module 302 controls processes which are carried out by the control unit 102. For example, the OS module 302 uses the USB mass storage driver module 304 and the USB HID driver module 305 to control devices to be controlled by the OS module 302 among the USB devices connected to the MFP 101 via the USB I/F 211. The expansion application 303 performs an expanded function which cannot be performed by the standard functions of the MFP 101. For example, the expansion application 303 uses the general-purpose driver module 306 to control devices to be controlled by the expansion application 303 among the USB devices connected to the MFP 101 via the USB I/F 211. In the present embodiment, by operating a setting screen 400 in FIG. 4, the user is able to set control setting information about whether to provide control using the expansion application 303 or the OS module 302 with respect to each of class IDs of USB devices. The setting screen 400 has setting buttons 401 and 402.

The setting button 401 is for setting whether to control a USB device of the USB HID class using the expansion application 303 or the OS module 302. When the setting button 401 is set to "ON", the setting that the USB device of the USB HID class is to be controlled using the expansion application 303 is made. On the other hand, when the setting button 401 is set to "OFF", the setting that the USB device of the USB HID class is to be controlled using the OS module 302 is made.

The setting button 402 is for setting whether to control a USB device of the USB mass storage class using the expansion application 303 or the OS module 302. When the setting button 402 is set to "ON", the setting that the USB device of the USB mass storage class is to be controlled using the OS module 302 is made. On the other hand, when the setting button 402 is set to "OFF", the setting that the USB device of the USB mass storage class is to be controlled using the OS module 302 is made. It should be noted that in the present embodiment, the control setting information on classes other than the USB HID class and the USB mass storage class may be configured on the setting screen 400. The control setting information set through operation on the setting screen 400 is stored in the setting value storage area 208 of the flash memory 206.

The USB mass storage driver module 304 controls USB devices of the USB mass storage class among the devices to be controlled by the OS module 302. The USB HID driver module 305 controls USB devices of the USB HID class among the devices to be controlled by the OS module 302. The general-purpose driver module 306 controls the devices to be controlled by the expansion application 303 and USB devices of class IDs other than the USB HID class and the USB mass storage class.

Upon detecting a USB device connected to the MFP 101, the driver selection module 307 selects a driver module that is to control this USB device. Specifically, according to a type of the USB device connected to the MFP 101, the driver selection module 307 selects a driver module from among the USB mass storage driver module 304, the USB HID driver module 305, and the general-purpose driver module 306. The USB I/F control module 308 controls the USB I/F 211. In the present embodiment, the USB mass storage driver module 304, the USB HID driver module 305, and the general-purpose driver module 306 controls the USB device, which is connected to the MFP 101, via the USB I/F control module 308.

Figure 5:
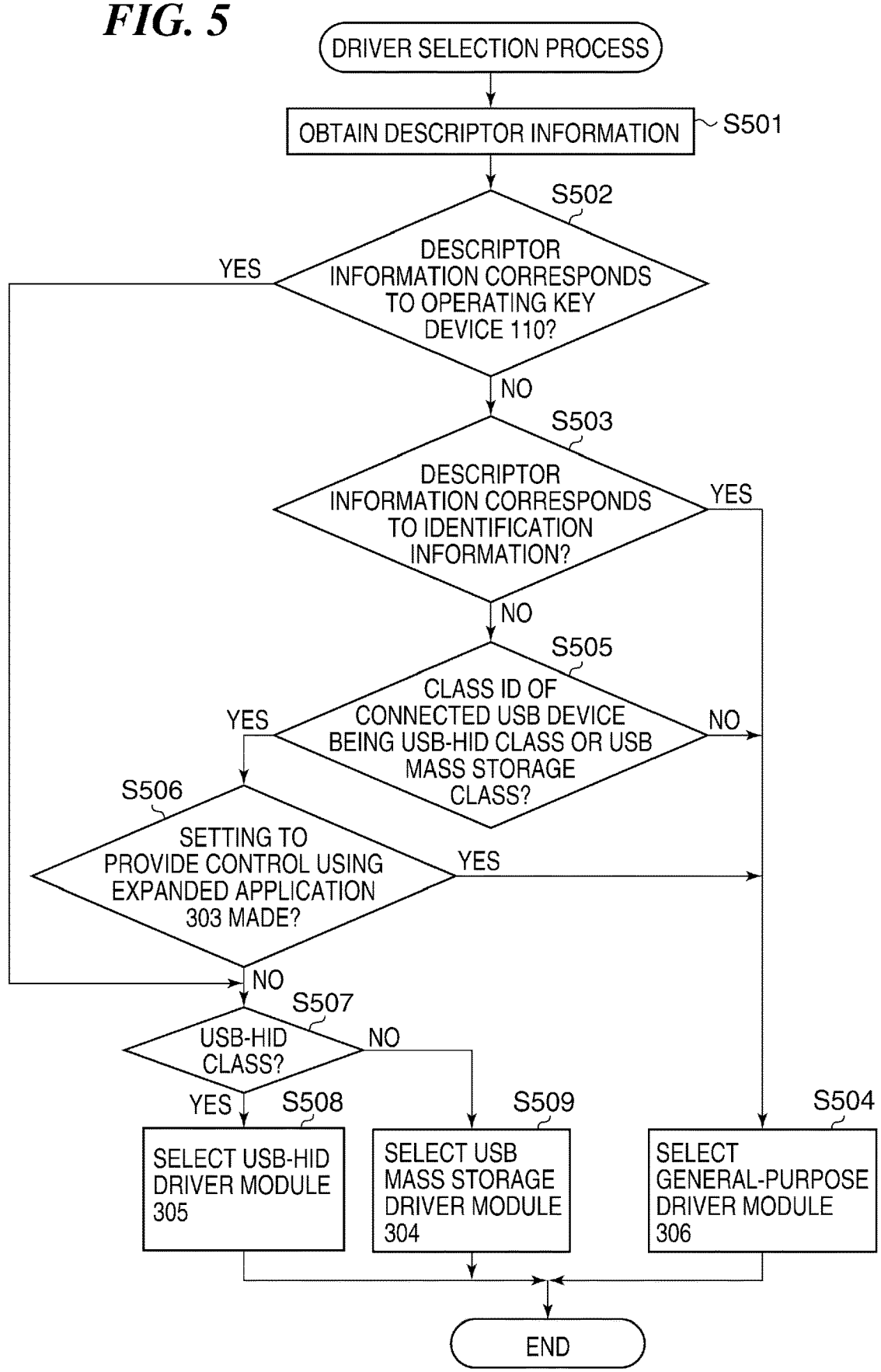
FIG. 5 is a flowchart showing the procedure of a driver selection process which is carried out by the MFP in FIG. 1.

FIG. 5 is a flowchart showing the procedure of a driver selection process which is carried out by the MFP 101 in FIG. 1.

The process in FIG. 5 is carried out by the CPU 201 executing programs stored in the flash memory 206. The process in FIG. 5 is started, for example, when a USB device is connected to the MFP 101 while the MFP 101 is running or when the MFP 101 is started with a USB device connected to the MFP 101 being at standstill. When a plurality of USB devices is connected to the MFP 101, the process in FIG. 5 is carried out for each of the USB devices.

Here, the MFP 101 has an arrangement in which an operating key unit for the MFP 101 is externally added as the operating key device 110 to the MFP 101 as distinct from the specifications of the conventional MFPs. With this arrangement, the operating key device 110 which is the operating key unit for the MFP 101 is a target to be controlled by the expansion application 303 as distinct from the conventional arrangement. For this reason, if the expansion application 303 developed based on the specifications of the conventional MFPs is installed in the MFP 101 to which the operating key device 110 is externally added, the expansion application 303 which is not ready for control on the operating key device 110 would cause a malfunction of the operating key device 110. To prevent a malfunction of the operating key device 110, for example, deleting the setting on the USB HID class from the identification information is conceivable. However, when the setting on the USB HID class is deleted from the identification information, the expansion application 303 cannot use even USB devices of the USB HID class such as the USB keyboard 214 other than the operating key device 110, and this decreases general versatility of the expansion application 303 for USB devices. Moreover, in consideration of the general versatility of the expansion application for USB devices, if the expansion application 303 including the identification information from which the setting on the USB HID class has been deleted is developed as an expansion application for exclusive use in the MFP 101, this expansion application 303 cannot be used for other MFPs. This results in a decrease in general versatility of the expansion application 303 for MFP models. Namely, the MFP 101 is required to change the identification information on the expansion application 303 so as to prevent a malfunction of the operating key device 110, and this presents a problem of causing a decrease in general versatility of the expansion application 303.

To cope with this problem, in the present embodiment, when the connected USB device is a predetermined operating device incompatible with the expansion application 303, the connected USB device is controlled by the OS module 302.

Referring to FIG. 5, first, the CPU 201 obtains descriptor information defined by the USB standards from the connected USB device (step S501). The descriptor information includes the class ID of the USB device and information which identifies the USB device alone i.e. the vender ID and the product ID of the USB device. Next, the CPU 201 determines whether or not the obtained descriptor information corresponds to the operating key device 110 which is a predetermined operating device incompatible with the expansion application 303 (step S502). The predetermined operating device is set in advance. In the step S502, when the vender ID and the product ID in the obtained descriptor information match a vender ID and a product ID of the operating key device 110, the CPU 201 determines that the descriptor information corresponds to the operating key device 110. On the other hand, when the vender ID and the product ID in the obtained descriptor information do not match the vender ID and the product ID of the operating key device 110, the CPU 201 determines that the descriptor information does not correspond to the operating key device 110.

As a result of the determination in the step S502, when the descriptor information corresponds to the operating key device 110, the CPU 201 decides to control the connected USB device using the OS module 302 and then carries out processes in step S507 and the subsequent steps, to be described later. Specifically, in the present embodiment, when the connected USB device is the operating key device 110, the connected USB device is controlled by the OS module 302 irrespective of settings on the setting screen 400.

As a result of the determination in the step S502, when the descriptor information does not correspond to the operating key device 110, the CPU 201 determines whether or not the descriptor information corresponds to identification information stored in the flash memory 206 (step S503). In the step S503, when the class ID of the descriptor information matches the class ID, or the vender ID and the product ID included in the identification information, the CPU 201 determines that the descriptor information corresponds to the identification information. On the other hand, when the class ID of the descriptor information does not match the class ID, or the vender ID and the product ID included in the identification information, the CPU 201 determines that the descriptor information does not correspond to the identification information.

As a result of the determination in the step S503, when the descriptor information corresponds to the identification information, the CPU 201 selects the general-purpose driver module 306 as the driver module that is to control the connected USB device (step S504) and ends the present process.

As a result of the determination in the step S503, when the descriptor information does not correspond to the identification information, the CPU 201 identifies a class ID of the connected USB device based on the descriptor information. After that, the CPU 201 determines whether or not the connected USB device is of the USB HID class or the USB mass storage class (step S505).

As a result of the determination in the step S505, when the connected USB device is neither of the USB HID class nor of the USB mass storage class, the CPU 201 carries out the processes in the step S504 and the subsequent steps. On the other hand, as a result of the determination in the step S505, when the connected USB device is of the USB HID class or the USB mass storage class, the CPU 201 checks control setting information stored in the flash memory 206. The CPU 201 determines whether or not the setting indicating that control is to be provided using the expansion application 303 has been made for the type of the connected USB device (step S506).

As a result of the determination in the step S506, when the setting indicating that control is to be provided using the expansion application 303 has been made, the CPU 201 carries out the processes in the step S504 and the subsequent steps. On the other hand, as a result of the determination in the step S506, when the setting indicating that control is to be provided using the expansion application 303 has not been made, that is, when the setting indicating that control is to be provided using the OS module 302 has been made, the CPU 201 determines whether or not the class ID of the connected USB device is the USB HID class (step S507).

As a result of the determination in the step S507, when the class ID of the connected USB device is the USB HID class, the CPU 201 selects the USB HID driver module 305 as the driver module that is to control the connected USB device (step S508) and ends the present process. On the other hand, as a result of the determination in the step S507, when the class ID of the connected USB device is not the USB HID class, the CPU 201 selects the USB mass storage driver module 304 as the driver module that is to control the connected USB device (step S509) and ends the present process.

According to the process in FIG. 5 described above, when the connected USB device is the operating key device 110 incompatible with the expansion application 303, the connected USB device is controlled using the OS module 302. This eliminates the need to change the identification information on the expansion application 303 in order to prevent the operating key device 110 from malfunctioning due to its incompatibility with the expansion application 303, and therefore ensures general versatility of the expansion application 303.

Moreover, in the process in FIG. 5 described above, when the connected USB device is the operating key device 110, the connected USB device is controlled using the OS module 302 irrespective of settings on the setting screen 400. This reliably prevents the operating key device 110 from malfunctioning due to its incompatibility with the expansion application 303.

Furthermore, in the process in FIG. 5 described above, whether or not the connected USB device is the operating key device 110 is determined based on the vender ID and the product ID, which identify the USB device alone and have been obtained from the connected USB device. It is thus possible to reliably determine whether or not the connected USB device is the operating key device 110.

In the process in FIG. 5 described above, the USB device is a device of the USB HID class capable of carrying out communications via the USB I/F 211 comprised of relatively inexpensive components. As a result, production costs are reduced as compared to conventional MFPs.

Although in the above description of the present embodiment, it is assumed that the predetermined operating device is the operating key device 110, the predetermined operating device should not necessarily be the operating key device 110 but may be USB devices that perform other functions. Moreover, the number of predetermined operating devices should not necessarily be one, but as shown in FIG. 6, a plurality of USB devices may be set as predetermined operating devices.

Furthermore, in the present embodiment described above, when the connected USB device is to be controlled using the OS module 302 although the connected USB device is of a type for which the setting indicating that control is to be provided using the expansion application 303 has been made, the LCD panel 109 or the like may be caused to show a message (or provide notification) that the connected USB device is to be controlled differently from settings on the setting screen 400. As a result, the user easily recognizes that control is to be provided differently from settings on the setting screen 400.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-159136, filed Aug. 15, 2016, which is hereby incorporated by reference herein in its entirety.

What is claimed is:

1. An image processing apparatus that has an operating system and an application comprising:
   a communication interface configured to communicate with a connected device;
   a memory configured to store instructions; and
   one or more processors configured to execute the stored instructions to provide:
   a setting unit configured to via an operating section of the image processing apparatus, set control of the connected device by using a first driver used for controlling the connected device by the application;
   a determination unit configured to determine, based on information that identifies the connected device and which has been obtained from the connected device, whether the connected device is a predetermined operating key device that operates the image processing apparatus; and
   a control unit configured to prohibit control of the predetermined operating key device by using the first driver and configured to control the predetermined operating key device by using a second driver which is used for controlling the predetermined operating key device by the operating system, even in a case where the setting unit sets to control the predetermined operating key device by using the first driver; and
   a notification unit configured to, when the predetermined operating key device is controlled using the second driver even in the case where the setting unit sets to control the predetermined operating key device by the first driver, provide notification that the predetermined operating key device is to be controlled differently from the setting set by the setting unit.

2. The image processing apparatus according to claim 1, wherein, based on a vender ID and a product ID that identify the connected device and have been obtained from the connected device, the determination unit is configured to determine whether the connected device is the predetermined operating key device.

3. The image processing apparatus according to claim 1, wherein the predetermined operating key device is a USB device of a USB HID class that conforms to USB standards.

4. A method of controlling an image processing apparatus that has an operating system and an application, the method comprising:
   a communication step of communicating with a connected device;
   a setting step of via an operating section of the image processing apparatus, setting control of the connected device by using a first driver used for controlling the connected device by the application;
   a determination step of determining, based on information that identifies the connected device and which has been obtained from the connected device, whether the connected device is a predetermined operating key device that operates the image processing apparatus; and
   a control step of prohibiting control of the predetermined operating key device by using the first driver and controlling the predetermined operating key device by using a second driver which is used for controlling the predetermined operating key device by the operating system, even in a case where setting to control the predetermined operating key device by using the first driver is made in the setting step; and
   a notification step providing a notification, when the predetermined operating key device is controlled using the second driver even in the case where the setting step sets to control the predetermined operating key device by the first driver, that the predetermined operating key device is to be controlled differently from the setting set by the setting step.

5. A non-transitory computer-readable storage medium storing a program for causing a computer to execute a method of controlling an image processing apparatus that has an operating system and an application, the method comprising:
   a communication step of communicating with a connected device;
   a setting step of via an operating section of the image processing apparatus, setting control of the connected device by using a first driver used for controlling the connected device by the application;
   a determination step of determining, based on information that identifies the connected device and which has been obtained from the connected device, whether the connected device is a predetermined operating key device that operates the image processing apparatus; and
   a control step of prohibiting control of the predetermined operating key device by using the first driver and controlling the predetermined operating key device by using a second driver which is used for controlling the predetermined operating key device by the operating system, even in a case where setting to control the predetermined operating key device by using the first driver is made in the setting step; and
   a notification step providing a notification, when the predetermined operating key device is controlled using the second driver even in the case where the setting step sets to control the predetermined operating key device by the first driver, that the predetermined operating key device is to be controlled differently from the setting set by the setting step.

6. The image processing apparatus according to claim 1, wherein the second driver is a USB HID driver.

7. The image processing apparatus according to claim 1, wherein the first driver is a general purpose driver.

8. The image processing apparatus according to claim 1, wherein the information that identifies the connected device corresponds to a Vender ID and a product ID of the connected device.

* * * * *